Sept. 17, 1968　　　　J. F. LARKIN　　　　3,401,807
TRANSFER MECHANISM
Filed March 21, 1967　　　　　　　　　　　3 Sheets-Sheet 1
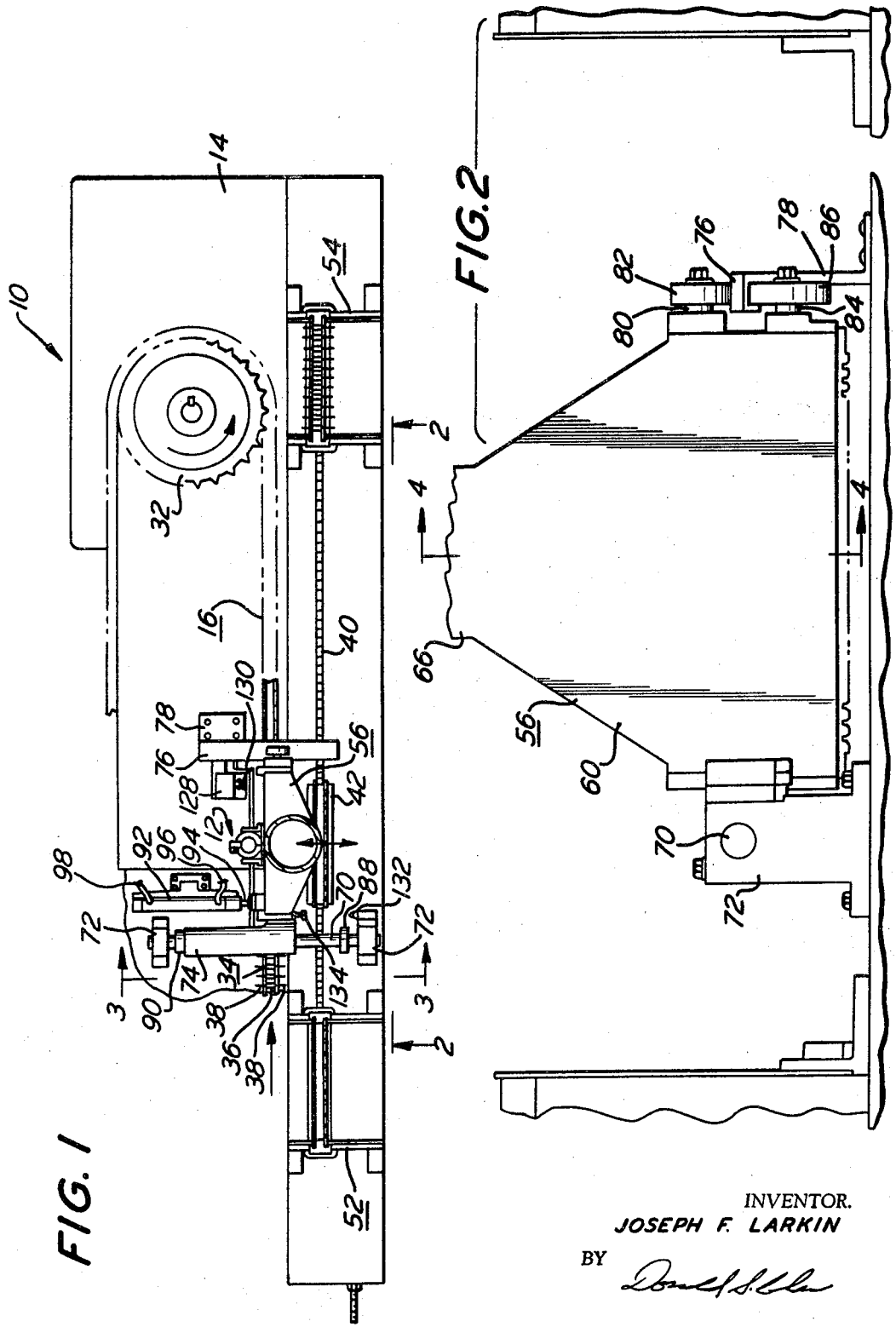
INVENTOR.
JOSEPH F. LARKIN
BY
ATTORNEY Sept. 17, 1968 J. F. LARKIN 3,401,807
TRANSFER MECHANISM
Filed March 21, 1967 3 Sheets-Sheet 2
FIG. 3
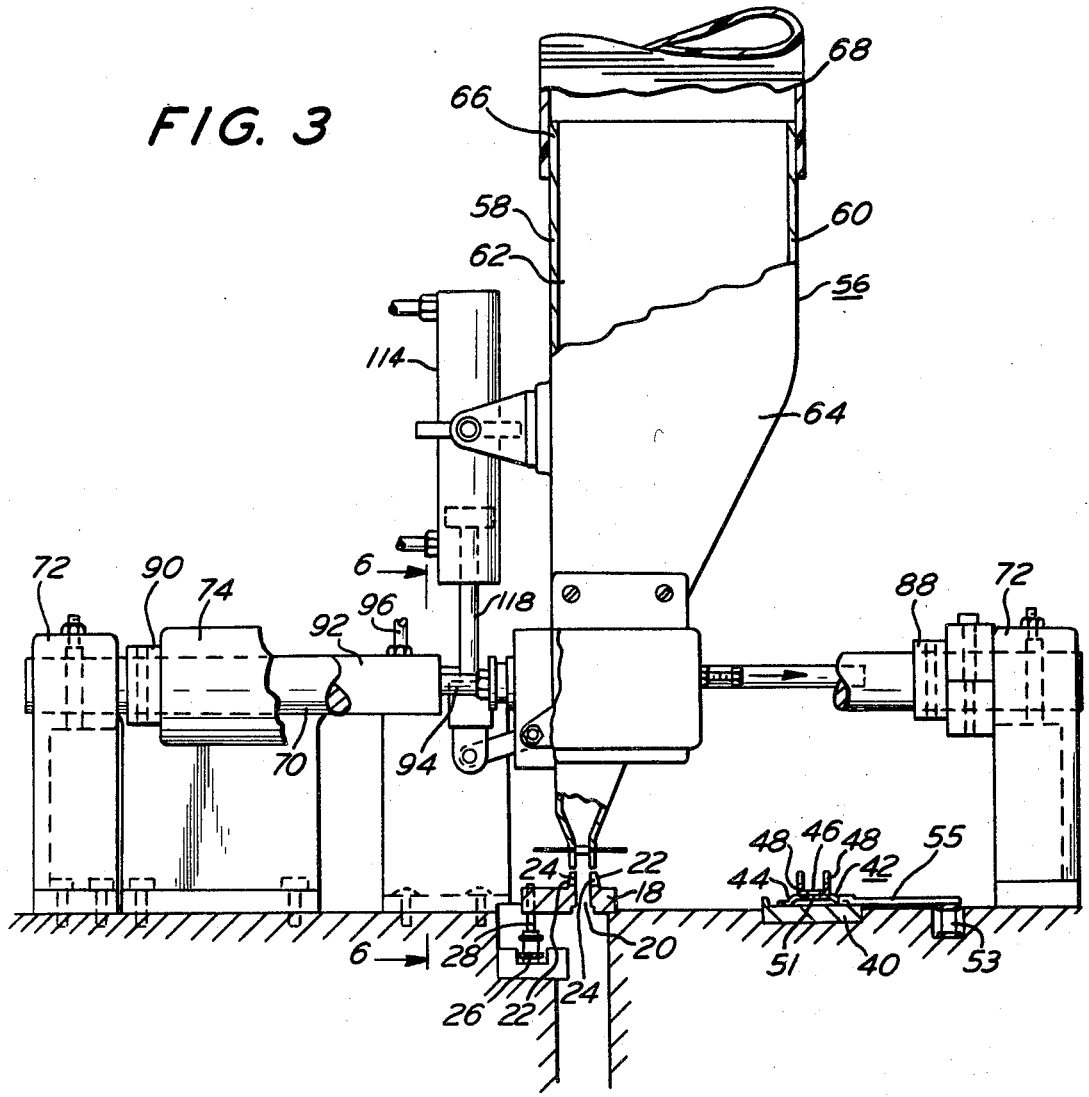
FIG. 7
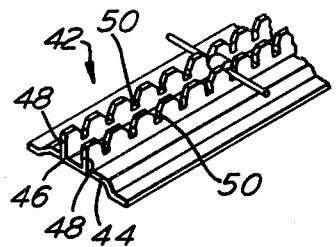
INVENTOR.
JOSEPH F. LARKIN
BY
ATTORNEY Sept. 17, 1968       J. F. LARKIN       3,401,807
TRANSFER MECHANISM
Filed March 21, 1967       3 Sheets-Sheet 3
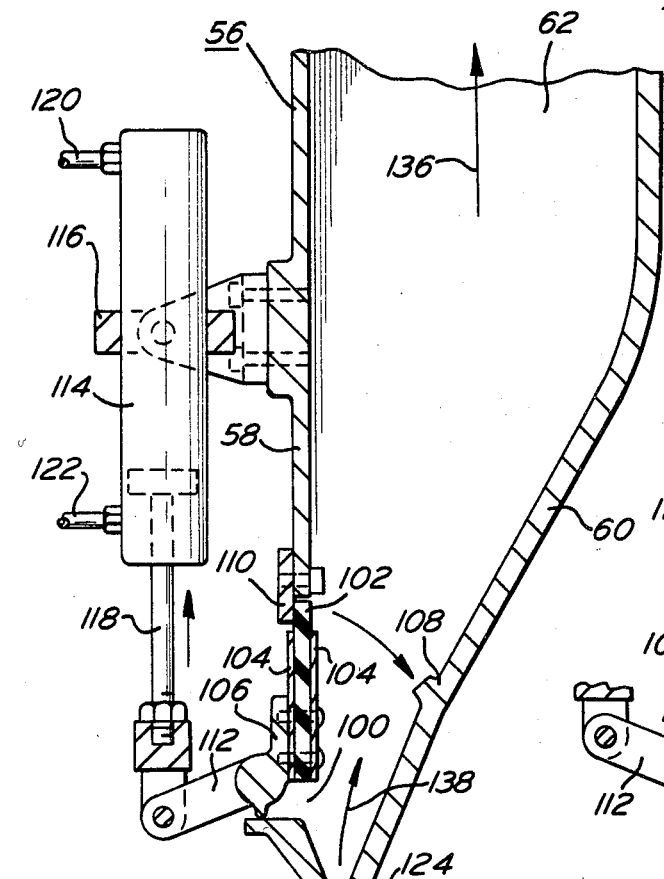
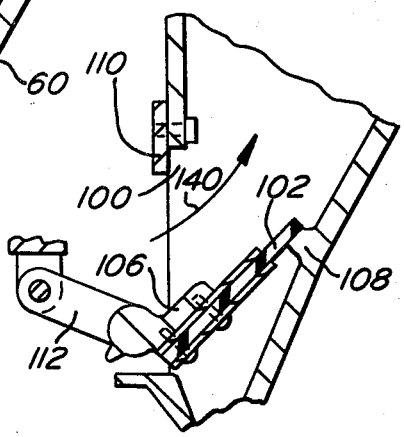
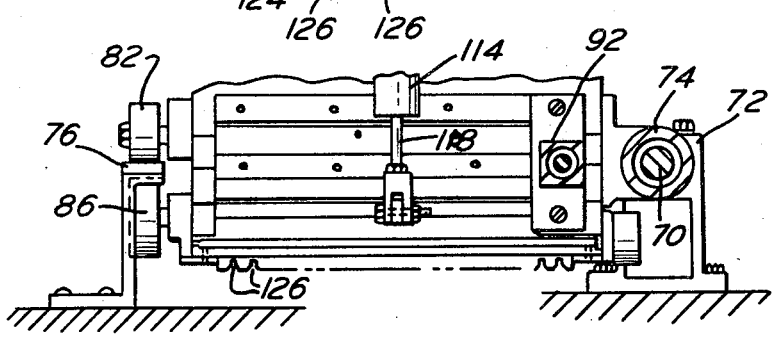
INVENTOR.
JOSEPH F. LARKIN
BY
ATTORNEY

United States Patent Office 3,401,807
Patented Sept. 17, 1968

3,401,807
TRANSFER MECHANISM
Joseph F. Larkin, Holland, Pa., assignor to
IRC, Inc., Philadelphia, Pa.
Filed Mar. 21, 1967, Ser. No. 624,867
6 Claims. (Cl. 214—1)

ABSTRACT OF THE DISCLOSURE

The transfer head reciprocates from a position over conveyor feeding elongated electrical components to a position directly over a rack. The transfer head has an opening in one of its walls near the pick-up nozzle and a flipper valve is pivotally mounted at the opening. Air is continuously drawn through the transfer head and the flipper valve quickly creates suction at the nozzle for rapid transfer action.

Background

In the manufacture of electrical components of the type having a body portion with lead wires extending longitudinally from opposite ends of the body portion, such as resistors, capacitors, diodes, etc., the components are often carried through apparatus which perform the various operations of manufacturing the components on a continuously moving conveyor on which the components are supported in closely spaced, parallel relation. After the particular operation performed by the apparatus is completed, it then becomes desirable to transfer the components from the continuously moving conveyor to racks on which the components can be carried to another apparatus for the next step of the manufacturing operation. Although the components can be transferred from the conveyor to the racks by hand, such a hand operation is relatively slow and can interfere with the continuous movement of the conveyor. It is therefore desirable to be able to transfer the components from the conveyor to the racks by mechanical means. However, any such mechanical transfer means must be capable of handling the electrical components, which are small in size and often relatively fragile, without damaging the components, and at a sufficient speed so as to not cause any interruption in the continuous movement of the conveyor. Also, it is desirable for the transfer mechanism to be capable of transferring a plurality of the components at one time, preferably in quantities equal to the number of components that the rack will hold. In addition, in some cases, paint or other marking ink has been applied to the body of the component so that physical contact with the body must be avoided.

Summary

It is an object of the present invention to provide a transfer mechanism for transferring electrical components from a continuously moving conveyor to a rack.

It is another object of the present invention to provide a transfer mechanism for transferring electrical components from a continuously moving conveyor to a rack without stopping or interfering with the movement of the conveyor.

It is still another object of the present invention to provide a transfer mechanism for transferring a plurality of electrical components at one time from a continuously moving conveyor to a rack without stopping or interfering with the movement of the conveyor.

It is a further object of the present invention to provide a transfer mechanism for transferring electrical components from a continuously moving conveyor to a rack including a transfer head movable between a position directly over the conveyor and a position directly over the rack which utilizes suction to lift the electrical components from the conveyor to the transfer head and which breaks the suction to drop the electrical components into the rack.

It is a still further object of the present invention to provide a suction type transfer head for transferring electrical components from a continuously moving conveyor to a rack which transfer head includes a flipper valve in a wall thereof adjacent its bottom opening to provide for quick making and breaking of the suction action so that the transfer can be made without stopping or interfering with the movement of the conveyor.

Other objects will appear hereinafter.

Brief description of the drawings

For the purpose of illustrating the invention, there is shown in the drawings a form which is presently preferred; it being understood, however, that this invention is not limited to the precise arrangements and instrumentalities shown.

FIGURE 1 is a top plan view of an apparatus including the transfer mechanism of the present invention.

FIGURE 2 is a front plan view taken along line 2—2 of FIGURE 1.

FIGURE 3 is an end view of the transfer mechanism of the present invention taken along line 3—3 of FIGURE 1.

FIGURE 4 is a sectional view of the transfer head taken along line 4—4 of FIGURE 2 and showing the flipper valve in closed position.

FIGURE 5 is a sectional view similar to FIGURE 4 of the valve portion of the transfer head showing the flipper valve in open position.

FIGURE 6 is a back plan view of the bottom portion of the transfer head taken along line 6—6 of FIGURE 3.

FIGURE 7 is a perspective view of a rack into which the electrical components are transferred.

Description of invention

Referring initially to FIGURE 1, there is shown an apparatus, generally designated as 10, which includes the transfer mechanism, generally designated as 12, of the present invention. Since the specific details of the construction of the apparatus 10 form no part of the present invention, only those portions of the apparatus 10 which relate to the operation of the transfer mechanism 12 will be described in any detail. The apparatus 10 comprises a horizontal table 14 on which an endless conveyor is supported to move in an endless path extending between the ends of the table. The endless conveyor 16 comprises a plurality of elongated, substantially rectangular plates 18 seated in end-to-end relation on the table 14 along the path of travel of the conveyor. As shown in FIGURE 3, each of the plates 18 has a longitudinally extending slot 20 therein, and a pair of parallel flanges 22 projecting upwardly from the top surface of the plate along the longitudinal edges of the slot. Each of the flanges 22 has a plurality of slits 24 therein uniformly spaced along the flange with each of the slits in one of the flanges being in alignment with a separate slit in the other flange. The plates 18 are driven by an endless chain 26 through drive pins 28 extending from the endless chain and fitting into holes in the plates. The endless chain 26 extends around a pair of sprocket wheels 32, only one of which is shown. One of the sprocket wheels 32 is rotated by a suitable power source, such as an electric motor, not shown, to drive the endless conveyor 16. As shown in FIGURE 1, the electrical components, generally designated as 34, are mounted on the plates 18 of the conveyor 16 in closely spaced, parallel relation with the body portions 36 of the components fitting between the flanges 22 of the plates and the lead wires 38, which extend from the ends of the body portions, extending through and seated in aligned slits 24 in the flanges 22.

Mounted on the table 14 and extending parallel to a portion of the path of travel of the conveyor 16 is a guide track 40 for the racks 42 to which the electrical components 34 are transferred. As shown in FIGURE 7, each of the racks 42 comprises an elongated, rectangular base plate 44 and a U-shaped member 46 mounted on and extending longitudinally along the base plate with the legs 48 of the U-shaped member extending upwardly from the base plate. Each of the legs 48 has a plurality of slits 50 therein uniformly spaced along the leg with each of the slits in one of the legs being in alignment with a separate one of the slits in the other leg. The spacing between the pairs of the aligned slits 50 along the rack 42 is equal to the spacing between the pairs of aligned slits 24 along the conveyor plates 18. Also, it is preferable that the number of pairs of aligned slits 50 in the rack 42 be equal to the number of pairs of aligned slits 24 in the conveyor plate 18 so that each of the racks 42 can hold the same number of the electrical components 34 as each of the conveyor plates 18. The bottom of the U-shaped member 46 and the base plate 44 have longitudinally spaced openings 51 therethrough which allow air to be drawn therethrough. The electrical components 34 are mounted on the rack 42 with the body portions 36 of the components fitting between the legs 48 and the lead wires 38 extending through and seated in aligned slits 50.

Referring again to FIGURE 1, at one end of the guide track 40 is a magazine 52 in which the empty racks 42 are stacked. At the other end of the guide track 40 is a stacking mechanism 54 which stacks the filled racks 42 so that a plurality of the filled racks can be manually removed from the apparatus 10 at one time. An endless chain 53 extends along the guide track 40 from the magazine 52 to the stacking mechanism 54 and is intermittently moved by suitable drive means, not shown. Pusher rods 55 are secured to the drive chain 53 at spaced points therealong. The pusher rods 55 ride on the table 14 and extend across the guide track 40 to engage the back end of a rack 42. Thus, the pusher rods 55 move the racks 42 along the guide track from the magazine 52 to the stacking mechanism 54 by an intermittent motion so that each rack 42 is brought into alignment with the transfer head and maintained in such a position until the rack is loaded with the electrical components.

The transfer mechanism 12 of the present invention is mounted on the table 14 and is movable between a position directly over the path of the conveyor 16 and a position directly over the guide track 40 for the racks 42. The transfer mechanism 12 comprises a transfer head 56 having a substantially flat, vertical back wall 58, a vertical front wall 60 and a pair of side walls 62 and 64 connecting the front wall to the back wall. As shown in FIGURE 4, at the bottom of the transfer head 56, the front wall 60 is close to the back wall 58 with the spacing therebetween being substantially equal to the length of the body portion of the electrical components to be transferred. Thus, the transfer head 56 has a narrow, rectangular opening at its bottom end. From the bottom of the transfer head 56, the front wall 60 tapers away from the back wall 58 and then extends vertically upwardly to the top of the transfer head. The side walls 62 and 64 of the transfer head 56 are parallel at the bottom portion of the transfer head and then converge to a cylindrical portion 66 at the top of the transfer head (ese FIGURE 2). Thus, the transfer head 56 has a circular opening at its top end. A flexible tube 68 is conected at one end to the cylindrical portion 66 of the transfer head (see FIGURE 3). The other end of the tube 68 is connected to means, not shown, for drawing air through the transfer head, such as a suction fan.

A supporting rod 70 extends across the conveyor 16 and the guide track 40 adjacent the side wall 64 of the transfer head 56 and is supported at its ends in posts 72 mounted on the table 14 (see FIGURE 1). The supporting rod 70 is in spaced, parallel relation to the table 14 and is perpendicular to the conveyor 16 and the guide track 40. A bearing sleeve 74 is slidably mounted on the supporting rod 70 and is secured to the side wall 64 of the transfer head 56. A supporting rail 76 extends across the conveyor 16 and the guide track 40 adjacent the side wall 62 of the transfer head 56 and is supported at one end on a post 78 mounted on the table 14. The supporting rail 76 is in spaced, parallel relation to the table 14 and is perpendicular to the conveyor 16 and the guide track 40. A stub shaft 80 is secured to the side wall 72 of the transfer head 56 and extends over the supporting rail 76. A wheel 82 is rotatably mounted on the stub shaft 80 and is seated on the supporting rail 76 so as to roll therealong. A second stub shaft 84 is secured to the side wall 62 of the transfer head 56 and extends beneath the supporting rail 76. A wheel 86 is rotatably mounted on the stub shaft 84 and engages the bottom of the supporting rail 76 so as to roll therealong. Thus, the transfer head 56 is supported on the supporting rod 70 and the supporting rail 76 for movement between its position over the conveyor 16 and its position over the guide track 40. The supporting rod 70 has a pair of stop flanges 88 and 90 adjacent its ends which are engaged by the ends of the bearing sleeve 74 to limit the movement of the transfer head 56 between its two positions.

A hydraulically operated cylinder 92 is mounted on the table 14 adjacent the back wall 58 of the transfer head 56 and extends parallel to the supporting rod 70. The piston rod 94 of the hydraulic cylinder 92 is connected at its front end to the back wall 58 of the transfer head 56. Tubes 96 and 98 connect the inlet ports at the ends of the hydraulic cylinder 92 to a source of oil under pressure through suitable valves, not shown. Thus, when oil is admitted through the tube 98 into the back end of the hydraulic cylinder 90, the piston rod 94 is moved forwardly to move the transfer head 56 from its position over the conveyor 16 to its position over a rack 42. When oil is admitted through the tube 96 into the front end of the hydraulic cylinder 92, the piston rod 94 is moved back to return the transfer head 56 to its position over the conveyor 16.

Referring to FIGURE 4, the back wall 58 of the transfer head 56 has a rectangular opening 100 therein adjacent the bottom end of the transfer head. A rectangular flipper valve plate 102 of a resilient material, such as rubber or a plastic, extends across the opening 100. The valve plate 102 is reinforced by a pair of thin metal plates 104 which are secured to opposite sides of the valve plate leaving the upper edge of the valve plate exposed. A supporting plate 106 extends across and is secured to the outer sides of the valve plate 102 along the bottom edge of the valve plate. The supporting plate 106 has pins projecting from its side edges which are pivotally mounted on the side walls 62 and 64 of the transfer head 56. Thus, the valve plate 102 is pivotable about a horizontal axis between a position in which the valve plate extends across the opening 100 as shown in FIGURE 4, and a position in which the valve plate extends across the interior of the transfer head as shown in FIGURE 5. The front wall 60 of the transfer head 56 has a valve seat 108 on its inner surface which the upper edge of the valve plate 102 engages when the valve plate extends across the interior of the transfer head. A stop plate 110 is secured to the outer surface of the back wall 58 of the transfer head 56 and extends along the upper edge of the opening 100. The upper edge of the valve plate 102 engages the stop plate 110 when the valve plate extends across the opening 100. An actuating arm 112 extends outwardly from the supporting plate 106 perpendicular to the axis of pivotation of the valve plate 102.

An air cylinder 114 is secured in a bracket 116 mounted on the outer surface of the back wall 58 of the transfer head 56 with the air cylinder being substantially parallel to the back wall. The piston rod 118 of the air cylinder 114 extends downwardly from the bottom end of the air cylinder and is pivotally connected at its bottom end to the actuating arm 112. Tubes 120 and 122 connect the inlet ports at the ends of the air cylinder 114 to a source of air under pressure through suitable valves, not shown. Thus, when air is admitted through tube 120 into the top end of the air cylinder 114, the piston rod 118 is moved downwardly to pivot the valve plate 102 to its vertical position across the opening 100. When air is admitted through tube 122 into the bottom end of the air cylinder 114, the piston rod 118 is moved upwardly to pivot the valve plate 102 to its position across the interior of the transfer head 56 and against the valve seat 108.

At the bottom end of the transfer head 56, a pair of identical plates 124—124 extend along and are secured to the inner surface of the back wall 58 and the front wall 60 of the transfer head. The plate 124 extends along the entire width of the transfer head 56 and projects downwardly beyond the bottom end of the walls 58 and 60. Each of the plates 124 has a plurality of spaced slits 126 on its bottommost edge with each of the slits on one of the plates being in alignment with a separate slit in the other plate. The spacing between the pairs of the aligned slits 126 along the plates 124 is equal to the spacing between the pairs of aligned slits in the conveyor plate 18 and the rack 42. Also, it is preferable that the number of pairs of aligned slits 126 in the plates 124 be equal to the number of pairs of aligned slits in the conveyor plates 18 and the rack 42. Thus, as shown in FIGURE 3, the conveyor head 56 is adapted to receive the electrical components 34 with the body portions 36 fitting between the plates 124 and the lead wires 38 extending through the slits 126.

Referring again to FIGURE 1, a micro-switch 128 is mounted on the table 14 adjacent the supporting rail post 78 and the conveyor 16. The microswitch 128 has an actuating arm 130 which projects into the path of the conveyor plates 18 so that the micro-switch is closed by each of the conveyor plates when the conveyor plate is completely under the transfer head 56. The micro-switch 128 is electriclly connected to a motor-driven timer which operates the control valves for the cylinders 92 and 114 in proper sequence with the closing of the micro-switch, starting the operation of a cycle of the transfer mechanism 12. Another switch 132 is mounted on the post 72 at the front end of the supporting rod 70. An actuating member 134 extends from the front wall 60 of the transfer head 56 and is adapted to engage and close the switch 132 when the transfer head 56 reaches its position over the rack 42. The switch 132 is electrically connected to the control valves for the cylinders 92 and 114 so that the electrical components 34 will not be dropped from the transfer head 56 until the transfer head is directly over the rack 42.

*Operation of transfer mechanism*

For the operation of the transfer mechanism 12, the means for drawing air through the transfer head 56 is turned on so as to provide a continuous flow of air upwardly through the transfer head 56 as indicated by arrow 136 in FIGURE 4. Also, the conveyor drive means is turned on so that the conveyor 16 is continuously moved along its path over the table 14. The electrical components 34 are placed on the conveyor plates 18 at some point along the path of travel of the conveyor 16 and are carried by the conveyor through a mechanism for performing a manufacturing operation on the components. The conveyor 16 then carries the electrical components 34 to the transfer mechanism 12.

The cycle of operation of the transfer mechanism 12 starts with the transfer head 56 being in its position directly over the conveyor 16 as shown in FIGURES 1 and 3. When a conveyor plate 18 containing the electrical components 34 is completely under the transfer head 56, the conveyor plate engages the micro-switch activating arm 130 and closes the micro-switch 128. This causes air under pressure to enter the top end of the flipper valve air cylinder 114 through the tube 120. As previously described, this moves the piston rod 118 downwardly to pivot the valve plate 102 to its vertical position across the opening 100 as shown in FIGURE 4. With the opening 100 closed by the valve plate 102, the air is drawn upwardly into the transfer head 56 through the bottom end of the transfer head as indicated by arrow 138 in FIGURE 4. Since the bottom end of the transfer head 56 is directly over the conveyor plate 18 as shown in FIGURE 3, the flow of air upwardly through the bottom end of the transfer head draws the electrical components 34 from the conveyor plate 18 up to and against the plates 124 of the transfer head with the body portion 36 of the components fitting between the plates 124 and the lead wire 38 of each of the components extending through the slits 126 in the plates 124.

Oil under pressure is then admitted into the back end of the hydraulic cylinder 92 through the tube 98 so as to move the piston rod 94 forwardly. This moves the transfer head 56 from its position over the conveyor 16 to its position over a rack 42. When the transfer head 56 reaches its position over the rack 42, the activating member 134 engages the switch 132 to close the switch. This allows the timer to operate valves to cause air to be admitted into the bottom end of the flipper valve's air cylinder 114 through the tube 122. The piston rod 118 is thus moved upwardly to pivot the valve plate 102 to its position across the interior of the transfer head 56 as shown in FIGURE 5. With the valve plate 102 extending across the transfer head 56, the flow of air into the transfer head is diverted from the bottom end of the transfer head to the opening 100 as indicated by arrow 140 in FIGURE 5. With the flow of air through the bottom end of the transfer head 56 being cut off, the electrical components 34 drop under their own weight from the transfer head into the rack 42 which has advanced and stopped beneath the transfer head.

Oil under pressure is then admitted into the front end of the hydraulic cylinder 92 through the tube 96 to move the piston rod back. This moves the transfer head 56 back to its position over the conveyor 16. The transfer head 56 returns to its position over the conveyor 16 before the next-in-line conveyor plate 18 moves completely under the transfer head. Thus, when the next-in-line conveyor plate 18 comes completely under the transfer head 56, the conveyor plate engages the micro-switch activating arm 130 to repeat the transfer cycle. In the meantime, the loaded rack 42 is moved out of the way and replaced by an empty rack so as to receive the next group of the eletcrical components. It has been found that the transfer mechanism 12 can complete one complete transfer cycle in as little as three seconds. Thus, the transfer mechanism 12 can transfer the electrical components from a conveyor plate 18 to a rack 42 and return in plenty of time to pick up the electrical components from the next-in-line conveyor plate without stopping or interfering with the continuous movement of the conveyor 16.

The major factor which permits the fast operation of the transfer mechanism 12 is that the flow of air through the transfer head 56 is continuous and the pick up and dropping of the electrical components 34 is achieved by diverting the flow of air between the bottom end of the transfer head and the opening 100 in the back wall of the transfer head. Also, by having the flipper valve 102 located close to the bottom end of the transfer head 56, the diversion of the flow of air by the flipper valve quickly starts and cuts off the flow of air through the bottom end of the transfer head so that the electrical components 34 are quickly picked up from the conveyor 16 or dropped into the rack 42. Thus, the movement of the transfer head 56 from its position over the conveyor 16 to its position over the rack 42 can be initiated almost simultaneously with the pick up of the electrical components from the conveyor, and the return movement can be initiated almost simultaneously with the dropping of the electrical components into the rack. Thus, there is provided by the present invention a transfer mechanism which can transfer electrical components from a continuously moving conveyor to a rack without stopping or interfering with the movement of the conveyor and which can so transfer a plurality of the electrical components at one time.

The present invention may be embodied in other specific forms without departing from the spirit or essential attributes thereof, and accordingly, reference should be made to the appended claims, rather than to the foregoing specification as indicating the scope of the invention.

I claim:

1. Apparatus for transferring from a continuously moving conveyor to a rack positioned adjacent the conveyor axial lead electrical components of the type having a body portion and a lead wire extending axially from each end of the body portion, said apparatus comprising a vertically extending tubular transfer head having an open bottom end and an open top end, means supporting said transfer head for movement between a position in which the bottom end is directly over the conveyor and a position in which the bottom end is directly over the rack, said transfer head having an opening in the wall thereof adjacent its bottom end, means connected to the top end of the transfer head for contiuously drawing air upwardly through the transfer head, and valve means mounted on said transfer head and adapted to direct the flow of air into the transfer head between the bottom end and the opening in the wall.

2. Apparatus in accordance with claim 1 in which the transfer head is substantially rectangular having a front wall, a back wall and pair of side walls connected between the front wall and back wall, said back and front walls extending substantilay parallel to the path of travel of the continuously moving conveyor, and the opening in the wall of the transfer head is in the back wall.

3. Apparatus in accordance with claim 2 in which the valve means comprises a valve plate hingedly mounted on said transfer head and pivotable between a position in which the valve plate extends across the opening in the back wall and a position in which the valve plate extends across the interior of the transfer head and engages the inner surface of the front wall, and means connected to said valve plate to pivot the valve plate between said two positions.

4. Apparatus in accordance with claim 2 in which the means supporting the transfer head comprises a separate elongated support extending transversely across each of the side walls of the transfer head and over the conveyor and the rack, and means secured to each of the side walls and supported on the adjacent support for movement therealong, and means connected to said transfer head for moving the transfer head between its two said positions.

5. Apparatus in accordance with claim 2 in which the bottom end of the front wall of the transfer head is spaced from the bottom end of the back wall a distance substantially equal to the length of the body portions of the electrical components to be transferred by the transfer head, and a separate plate is secured to and extends along the inner surface of each of said front and back walls at the bottom end of said walls, said plates projecting beyond the bottom end of said walls and adapted to be engaged by the lead wires of the electrical components when the components are drawn from the conveyor to the transfer head with the body portions of the components fitting between said plates.

6. Apparatus in accordance with claim 5 in which each of said plates has a plurality of spaced slits in its bottom edge with each of the slits in one of said plates being in alignment with a separate slit in the other of said plates, said slits being adapted to receive the lead wires of the electrical components when the components are drawn from the conveyor to the transfer head.

References Cited
UNITED STATES PATENTS 3,363,779   1/1968   Matsushima _____ 198—20 X EDWARD A. SROKA, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,807            September 17, 1968

Joseph F. Larkin

It is certified that error appears in the above identified patent and that said Letters Patent are hereby corrected as shown below:

In the heading to the printed specification, line 4, "IRC, Inc., Philadelphia, Pa." should read -- TRW Inc., a corporation of Ohio --.

Signed and sealed this 3rd day of March 1970.

(SEAL)
Attest:

Edward M. Fletcher, Jr.           WILLIAM E. SCHUYLER, JR.
Attesting Officer                  Commissioner of Patents